3,728,288
IMPACT-RESISTANT RIGID POLYURETHANE FOAM COMPOSITIONS AND PROCESS OF MANUFACTURE

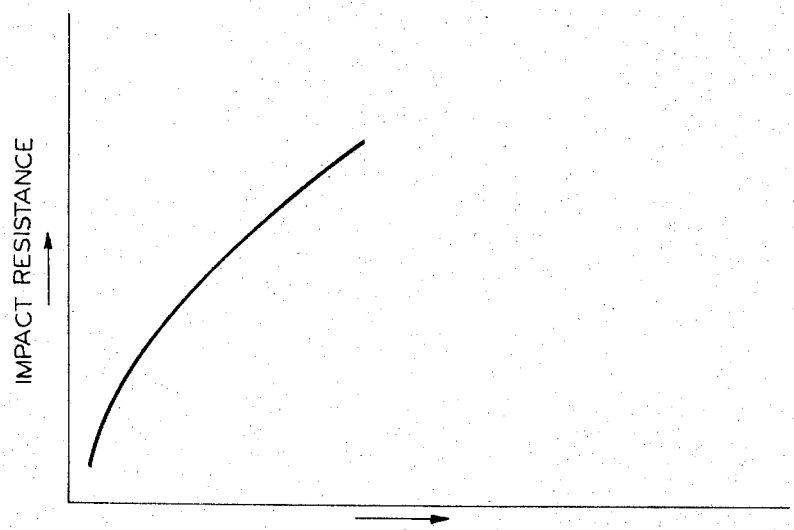

Walter H. Cobbs, Jr., Princeton, N.J., and Donald Dunn, Cincinnati, and Victor G. Soukup, Wyoming, Ohio, assignors to Cincinnati Milacron, Cincinnati, Ohio
Continuation-in-part of application Ser. No. 654,853, July 20, 1967. This application May 18, 1970, Ser. No. 38,514
Int. Cl. C08g 22/48
U.S. Cl. 260—2.5 BD                                      5 Claims

ABSTRACT OF THE DISCLOSURE

Improved rigid polyurethane foam compositions are obtained whose brittleness is substantially reduced and impact resistance increased by prereaction of a polyisocyanate with a relatively minor amount of a difunctional organic compound and thereafter reacting the thus formed NCO terminated prepolymer with a polyhydroxy compound in the presence of a blowing agent and, optionally, a catalyst and surfactant. The resultant foam is employable in molding operations to produce improved molded articles.

---

This invention relates to novel rigid polyurethane foam plastic compositions and, more particularly, to self-skinned high-density molded articles of rigid polyurethane foam having improved impact resistance. This application is a continuation-in-part of our copending case Ser. No. 654,853, filed July 20, 1967 and now abandoned.

Foam plastic materials such, for example, as foamed rigid polyurethanes have found wide applicability in fields wherein their light weight, relatively high strength to weight ratio, bouyancy and low thermal conductivity provide distinct advantages over other materials. However, these rigid polyurethane foams generally exhibit low impact strength (i.e. they fracture readily upon impact). In the past rigid polyurethane foam has found wide applicability in insulation applications wherein its thermal conductivity properties are superior to numerous other materials. However, there has been an increasing demand for the use of rigid polyurethane foam, in particular, high-density rigid polyurethane foam as a substitute for other materials in the preparation of intricately shaped articles such as furniture wherein its high strength to weight ratio and its ability to be formed into intricate shapes are important qualities.

The prior art type rigid polyurethane foam compositions have been found to be inadequate in the molding of these intricately shaped, structurally sound moldings because of (a) their poor flowability, (b) poor mixability, (c) tendency to produce numerous defects, and (d) low impact resistance of the moldings.

These and other disadvantages of the prior art rigid polyurethane foam compositions have been overcome by the practice of this invention, thereby enabling the preparation of commercially valuable intricately-shaped, impact-resistant moldings.

The preparation of rigid polyurethane foam is widely known and, in general, involves the reaction between an organic polyisocyanate and an organic compound containing three or more active hydrogen atoms, such organic compounds usually containing three or more hydroxyl groups. The reaction normally takes place in the presence of a blowing agent which produces a gaseous expanding agent through (a) reaction between two or more components of the foam formulation (e.g. reaction between water and the polyisocyanate to produce carbon dioxide), (b) the decomposition of one or more components of the foam formulation and (c) the volatilization of one or more inert liquid components of the foam formulation (e.g. volatilization of monofluorotrichloromethane). The volatilization of the inert liquid component is generally caused by the exothermic heat of reaction between the polyisocyanate and the polyhydroxy compound. Foam formulations in general usually contain surface active agents and catalysts for controlling cell generation and size and reactivity of the foam formulation respectively. The preparation of rigid polyurethane foam is generally achieved via the prepolymer, semi- or quasi-prepolymer, or one shot techniques.

Semi- or quasi-prepolymer methods usually involve reacting a portion of a polyhydroxy compound with all of the polyisocyanate to produce an isocyanate terminated quasi-prepolymer composition containing relatively high molecular weight, often highly branched, polymeric species having terminal isocyanate groups admixed with a relatively large amount of polyisocyanate. In producing quasi-prepolymers an isocyanate to hydroxyl mole ratio of about 4:1 is usually employed. Although this ratio may vary somewhat with the polyisocyanate, the polyhydroxy compound and the isocyanate concentration of the quasi-prepolymer, this ratio usually is significantly higher than the isocyanate-hydroxyl mole ratio used in the preparation of prepolymers. The quasi-prepolymer is then reacted with the remainder of the polyhydroxy compound or mixture of polyhydroxy compounds, usually the same polyhydroxy compound or compounds used to make the quasi-prepolymer, at the time the polyurethane foam is to be produced, in the presence of blowing agent, surfactant and catalyst. The blowing agent, surfactant and catalyst are usually, but not always, admixed with the polyhydroxy compound or compounds. The blowing agent and surfactant may in some cases be admixed with the quasi-prepolymer, especially in those cases where it is desirable to lower the initially high viscosity of the quasi-prepolymer. The polyhydroxy compound or compounds used to prepare rigid polyurethane foams via the quasi-prepolymer technique usually have 3 or more hydroxyl groups per molecule. Quasi-prepolymers used in the preparation of rigid polyurethane foams are usually the reaction product of a polyisocyanate (i.e. an organic compound containing 2 or more isocyanate groups per molecule) and a polyhydroxy compound having 3 or more hydroxyl groups per molecule. A primary disadvantage of known processes is that they yield very viscous prepolymers which are difficult to mix and to mold. Thus the foams may have heterogeneous chemical and physical compositions.

In the present state of the art in producing rigid polyurethane foam, the physical properties of the foam, at a given density, are generally controlled or varied through (a) varying the functionality of the polyisocyanate, (b) varying the functionality of the polyhydroxy compound, (c) varying the degree of aromaticity of the urethane polymer, (d) varying the structure of the polyisocyanate and polyhydroxy compound, (e) varying the length of the hyroxy terminated side chains on a tri- or higher functional nucleus of the polyhydroxy compound and (f) varying the molecular weight of the polyhydroxy compound. While all of these variations alone or in various combinations produce changes in the physical properties of the rigid foam such as hardness, dimensional stability, compressive strength and flexural strength, rigid polyurethane foams produced in the present state of the art tend to exhibit low impact strength and high rigidity, as well as the heterogeneity noted above.

The impact test employed for assessing the relative impact resistance (energy absorbing) properties of rigid polyurethane foam is not an ASTM test, however, it is somewhat analogous to the ASTM falling dart test (ASTM D 1709–62T) and is widely used by industry for assessing the impact resistance (energy absorbing properties) of various rigid materials including glass and plastics. It is frequently described as a drop ball impact test and basically involves dropping a ½ lb. steel ball (diameter 1½ inches) on to a 3 inch diameter impact area of the test specimen which is clamped between two 3-inch diameter rings so as to be rigidly supported from above and below. The height from which the ball is dropped is increased successively, in small (approximately 2-inch) increments after each impact until an observable failure (crack) occurs. In this test the impact point usually receives several and often numerous impacts from increasing heights prior to reaching the point of failure (drop height at which failure occurs).

It is an object of this invention to overcome the disadvantages of the prior art and to provide a method for improving the strength properties of polyurethane foam structures.

It is another and more specific object of this invention to provide a novel, improved polyurethane foam composition and a novel method for improving the impact resistance of rigid polyurethane foam.

Still another object of this invention is to produce self-skinned rigid foamed articles which are homogeneous in the skin and core regions, respectively.

Other objects and advantages of this invention will be apparent from the following description.

It has been found, according to this invention that the foregoing objects can be attained and that the brittleness of rigid polyurethane foam can be substantially reduced by the impact resistance increased by prereacting an organic polyisocyanate and a relatively minor amount of a difunctional organic compound or polymers or derivatives thereof having two terminal hydrogen atoms reactive with isocyanate groups, said compound having the general formula $$Z-\left(\begin{array}{cc} R_1 & R_2 \\ | & | \\ C-C-X \\ | & | \\ R_4 & R_3 \end{array}\right)_n Q$$

where Z= —OH, —SH, —NHR$_5$, —CONHR$_5$, —COOH,

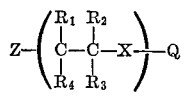, or 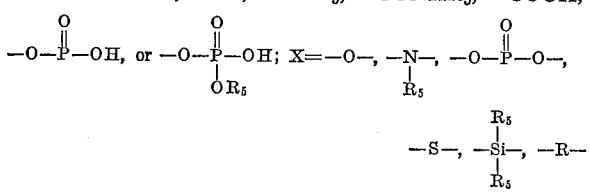

Q is H or

when X is —O—
Q is H when X is —S—
Q is H when X is

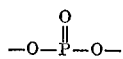

Q is H when X is

Q is OH or NHR$_5$ when X is $$\begin{array}{c} R_5 \\ | \\ -Si- \\ | \\ R_5 \end{array}$$

and Q is OH, NHR$_5$, CONHR$_5$, COOH or SH when X is R.

Where

R is a divalent aliphatic hydrocarbon radical with 1–20 carbon atoms;

R$_5$ is a monovalent alkyl with 1–5 carbon atoms;

R$_6$ is a divalent lower alkyl with 1–5 carbon atoms;

R$_{1-4}$ are hydrogen, halogen, aliphatic hydrocarbon preferably with 1–5 carbon atoms; aromatic hydrocarbon, e.g. phenyl; or the halogenated aliphatic or aromatic hydrocarbon radicals listed, (the polymers or derivatives thereof of said compounds have an M.W. of 100–20,000 preferably 400–3000), then reacting said product with an organic polyhydroxy compound having 3 or more hydroxyl groups per molecule or a mixture of polyhydroxy compounds having predominately polyhydroxy compounds having three or more hydroxy groups per molecule, provided said polyols or mixed polyols yield rigid polyurethane self-skinned foams. Foaming is conducted in the presence of blowing agent and optionally in the presence of catalyst and/or surfactant to produce a rigid self-skinned foam with chemical and physical homogeneity in the skin and core areas respectively.

The foregoing formula includes, but is not limited to, monomeric and polymeric compounds in which the end groups Z and XU or Q are isocyanate reactive groups such as hydroxyl, monosubstituted amino, monosubstituted amido, carboxyl, thiol, and the like. As examples of compounds contemplated within the scope of the above formula there are poly(oxyalkylene) diols, e.g. poly(oxyethylene) diols, poly(oxypropylene) diols, and poly(oxybutylene) diols; polyalkylene diols, e.g. polyethylene diols, polypropylene diols, and polybutylene diols; poly(oxyalkylene)diamines, e.g. poly(oxyethylene) diamine, poly(oxypropylene) diamine, and poly(oxybutylene) diamine; polyalkylene diamines, e.g. polyethylene diamines, polypropylene diamines and polybutylene diamines; ω-amino-poly(oxyalkylene) alcohols; ω-amino-polyalkylene alcohols; poly(oxyalkylene) dicarboxylic acids, e.g. poly(oxyethylene) dicarboxylic acid, poly(oxypropylene) dicarboxylic acid, and poly(oxybutylene) dicarboxylic acid; polyalkylene dicarboxylic acids; ω-hydroxy-poly(oxyalkylene) carboxylic acids; ω-amino-poly(oxyalkylene) carboxylic acids; poly(oxyalkylene) dicarboxamides; polyalkylene dicarboxamides; and the corresponding dithiols; the corresponding difunctional compounds of mixed functions, and the like. "Derivatives" of the polymers are, as listed above, the aminated, carboxylated, etc. polyoxyalkylene and polyalkylene compounds. By reason of the necessity of having two mono functional terminal groups in the above, the "amines" and "amides" are to be interpreted as mono-substituted compounds where the substituent is preferably a C$_{1-5}$ alkyl group thus yielding the —NHR$_5$ and —CONHR$_5$ radicals.

The polyisocyanates used are generally any aromatic or aliphatic compounds with two or more NCO groups, e.g. 2,4 TDI (tolylene diisocyanate), 2,4 TDI/2,6 TDI (80/20) mixture, diphenyl, methane-4,4'-diisocyanate hexamethylene, diisocyanate ethylene, hexylene, cyclohexyl, metaphenylene, or tolylene diisocyanates and tri-isocyanate such as triphenyl methane tri-isocyanate etc. Such compounds are well described in the patent literature.

Blowing agents preferred in the practice of this invention include but are not limited to halogenated hydrocarbons, or mixtures thereof.

Catalysts utilizable in the practice of this invention include trialkylamines, e.g. triethylamine, heterocyclic nitrogen compounds, e.g. N-ethyl morpholine; tin compounds e.g. stannous octoate, or combinations thereof and other known catalysts. Pigments, stabilizers, fillers, and other inert additives that do not react with the isocyanate may also be utilized in the practice of this invention.

In a preferred embodiment of this invention an organic polyisocyanate composition comprising an organic polyisocyanate admixed with an isocyanate-terminated adduct formed by reacting 2 molecules of an organic polyisocyanate with 1 molecule of an organic compound containing two isocyanate reactive hydroxyl groups per molecule is reacted with a polyhydroxy compound having three or more hydroxyl groups per molecule or a mixture of polyhydroxy compounds having predominately polyhydroxy compounds with 3 or more hydroxy groups per molecule in the presence of a blowing agent and optionally in the presence of a surfactant and catalyst at the time of foam production to produce a rigid polyurethane foam. It has been discovered that the impact resistance (i.e. resistance to fracture upon impact) of the rigid polyurethane foam produced by the practice of this invention is directly related to a complex function of such factors as (a) the concentration of linkages from the 2/1 polyisocyanate/diol adduct in the urethane polymer and (b) the number of chain atoms in the chain of the organic molecule containing two isocyanate reactive hydroxyl groups as shown in the figure and (c) the functionality of the polyol. It is realized that while hydroxyl-containing organic compounds are generally employed in the preparation of polyurethane foams and are suitable for use in this invention, other organic compounds containing 2 isocyanate reactive hydrogens per molecule may be suitable for the formation of isocyanate-terminated adduct formed by reacting 2 molecules of a polyisocyanate with 1 molecule of an organic compound containing 2 hydrogens reactive with isocyanate. Such organic compounds containing 2 isocyanate reactive hydrogens per molecule other than those containing 2 hydroxyl groups per molecule may include compounds containing 2 secondary amine groups per molecule, 1 secondary amine group and 1 hydroxyl group per molecule, 2 carboxyl groups per molecule, 1 carboxyl group and 1 secondary amine group per molecule, and 1 carboxyl group and 1 hydroxyl group per molecule.

In a further preferred embodiment of this invention poly(oxyalkylene) diols are reacted with organic polyisocyanates to form polyisocyanate compositions comprising organic polyisocyanate admixed with the isocyanate-terminated adduct formed by reacting 2 molecules of organic polyisocyanate with 1 molecule of poly(oxyalkylene) diol. Said organic polyisocyanate composition is then reacted with an organic polyhydroxy compound having 3 or more hydroxyl groups or mixtures of such polyhydroxy compounds in the presence of blowing agent, surfactant and catalyst to form a rigid polyurethane foam. Poly(oxyalkylene) diols such as poly(oxypropylene) diols, and poly(oxyethylene) diols and poly(oxypropylene/oxyethylene) copolymer diols having an average molecular weight in the range of about 100 to about 20,000 have been found to be effective in the practice of this invention. The polyhydroxy compounds having 3 or more hydroxy groups per molecule of mixtures identified previously used in the practice of this invention are e.g. the reaction products of one or more alkylene oxides, such as propylene oxide and ethylene oxide, with one or more polyhydric alcohols, such as sucrose, sorbitol, methyl glucoside and pentaerythritol, well known and described in the art, and other polyhydroxy compounds.

The large variety of organic polyisocyanates, diols and polyols available today precludes the investigation of all possible combinations. Therefore, several of the more widely used and representative organic polyisocyanates, diols and polyols were chosen for this investigation. The following diols, polyols and polyisocyanates were employed.

POLYISOCYANATES (a) MR (polymethylene polyphenyl isocyanate)

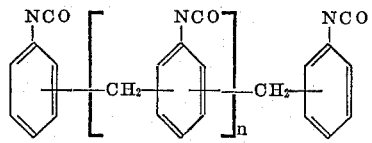

$n=0$ to 5
Percent NCO=32.00 (CMMCo analysis)
Visc. @ 25° C.=200 cps.

Functionality ≅ 2.7
Hydrolyzable chloride: 0.5% max.
Total chloride: 0.7% max.
Acidity: 0.2% max.

This well-known mixture of polyisocyanates is described in Adhesives Age, November 1965, pp. 30–34, particularly page 31, column 1, beginning at the paragraph captioned Mondur MR, while typical physical properties of this well-known mixture of polyisocyanates are set forth on page 19 of widely and publicly circulated Mobay Technical Information Bulletin T1B No. 76–F30. In the examples, unless otherwise indicated, the words "the polyisocyanate" are understood to mean Mondur MR described above.

(b) TD–80 (80/20 2,4-tolylene diisocyanate/2,6-tolylene diisocyanate isomer mixture)

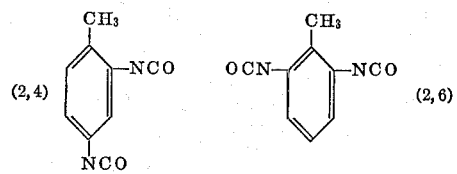

Percent NCO=48
Functionality=2

(c) NCO–10 (polymethylene polyphenyl isocyanate)

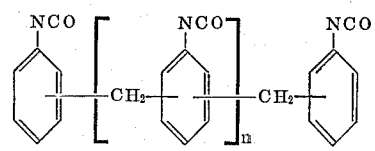

$n=0$ to 5
Percent NCO=32.09 (CMMCo analysis)
Visc. @ 25° C.=110 cps.
Functionality≅2.3

DIOLS (d) P400 [poly(oxypropylene)diol]-

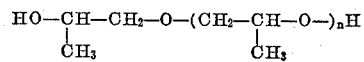

$n≅5$ to 7
Molecular weight (average)=401.8; calculated from OH#
Hydroxyl number=279.24 (CMMCo analysis) percent H₂O=0.057 (CMMCo analysis)
Visc. @ 77° F.=47.4 cps.

(e) P 1285 [poly(oxypropylene)diol]

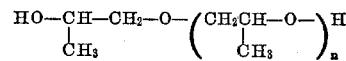

$n≅19$
Molecular weight (average)=1255.04; calculated from OH#
Hydroxyl number=89.4
Percent H₂O=0.02
Visc. @ 88° F.=150 cps.

POLYOLS (f) G–460 DMG (polyoxypropylated α-methyl glucoside)

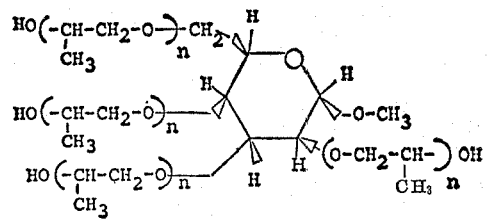

$n$ (average) = 1.33
Molecular weight (average) = 503.0; calculated from OH#
Hydroxyl number = 446.14; (CMMCo analysis)
Functionality = 4
Visc. @ 25° C. = 125,000 cps.

(g) RS–450 (polyoxypropylated sucrose)

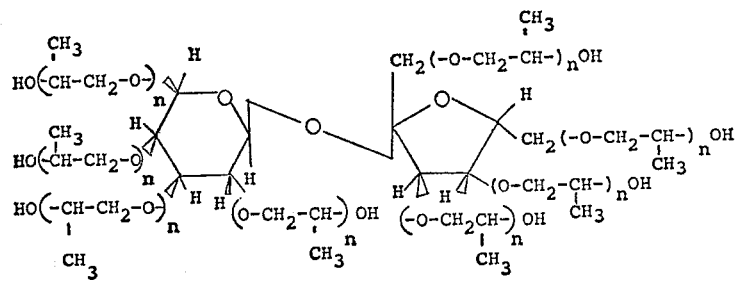

$n$ = 1.60 (average)
Molecular weight (average) = 1059.2; calculated from OH#
Hydroxyl number = 423.72 (CMMCo analysis)
Functionality = 8
Visc. @ 77° F. = 315,560 cks. (approx.)

(h) SP–760 (polyoxypropylated sorbitol)

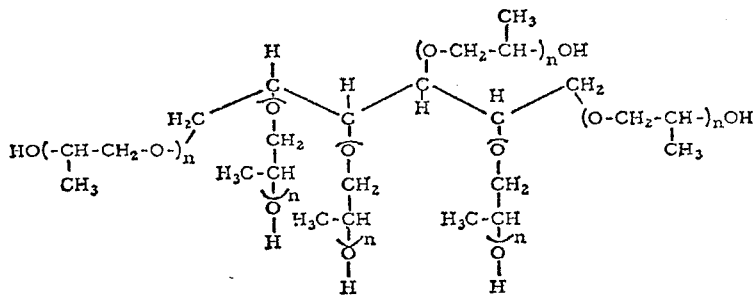

$n$ = 1.45 (average)
Molecular weight (average) = 686.4;
Molecular weight (average) = 686.4; calculated from OH#
Hydroxyl number = 490.39 (CMMCo analysis)
Functionality = 6
Visc. @ 25° C. = 13,100 cps.

(i) Ethylene glycol (Chromato quality)

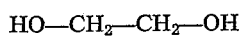

HO—CH$_2$—CH$_2$—OH

Molecular weight = 62
Hydroxyl number = 1807.93
Functionality = 2

In the specification at Table II where reference is made to the preparation of Foams A, B, C, D and E, and in the examples, where the words "polyether polyol" or "propyleneoxide-methyl glucoside, propylene oxide-glycerine adduct mixture" are used it shall be understood unless otherwise indicated to mean the commercially available product having a hydroxyl number of 400–440 obtained from the oxypropylation of an alpha-methyl glucoside/glycerine mixture (G–435) or any of those disclosed in U.S. 3,167,538 and as additionally described in the patentee's widely circulated bulletins e.g. Poly NR–2 on G–435.

In this specification reference to a surfactant as a "silicone glycol copolymer" is a reference to Surfactant #202 or #193 produced by Dow Corning Co. or any of those described in U.S. 3,402,192.

PROCEDURE A

Component A is the isocyanate containing material which is to be mixed with Component B (below) to form foams.

The quasi-prepolymers having a free NCO content of about 25.5% by weight were prepared by reacting a stoichiometric excess of MR or NCO–10 with the diol and/or polyol in a glass resin flask under a nitrogen blanket. The reaction was permitted to exotherm naturally, however, the temperature of the reacting system was not permitted to go above 50° C. In the case of TD–80, quasi-prepolymers were prepared having a free NCO content of about 35% by weight. The B-component used in conjunction with the polyisocyanates or quasi-prepolymers, in the one-shot and quasi-prepolymer formulations respectively, had the following composition:

| | Percent by wt. |
|---|---|
| Polyol | } 86.0 |
| Diol | |
| Monofluorotrichloromethane | 12.4 |
| DC–193 (a commercially available silicone glycol copolymer known in the art) | 1.0 |
| N,N,N',N' tetra methyl-1,3-butanediamine | 0.6 |

The free blow and molding experiments were carried out under the following conditions:

| | |
|---|---|
| NCO index (mole ratio NCO to OH groups) | 1.05. |
| A-component temp. | 110–120° F. |
| B-Component temp. | 70° F. |
| Mold temp. | 120° F. |
| Precure | 4 min. |
| Cure | 20' @ 180° F. |
| Mold charge (½ x 4 x 10 inch mold) | 106 g. |

The general molding technique involved mixing A and B components at the specified temperatures, charging the mixture to an aluminum mold, preheated as specified, closing and clamping said mold, allowing the charged mixture to react and foam to fill said mold and after the precure time, placing said mold in an oven at the specified cure conditions and removing the cured foam molding from said mold.

(a)

As mentioned before, we have found that impact resistance increases with increasing isocyanate-terminated adduct concentration in the urethane polymer and increasing number of chain atoms in the diol (see figure). As an example of the effect of the method of combining the constituents of the formulation on the impact resistance of rigid polyurethane foam molding, we have shown in Table I that the preparation of a polyisocyanate composition comprising polyisocyanate admixed with an isocyanate-terminated adduct formed by reacting 2 molecules of polyisocyanate with 1 molecule of poly(oxyalkylene) diol and the subsequent reaction of said polyisocyanate composition with a polyether polyol in the presence of blowing agent, surfactant and catalyst will yield a rigid polyurethane foam molding having impact resistance superior to the impact resistance of a rigid polyurethane foam molding prepared by the one-shot method wherein the same polyisocyanate, poly (oxyalkylene) diol and polyether polyol are reacted at the same time in the presence of the same blowing agent, surfactant and catalyst under essentially the same conditions. In the following tables Q.P. means quasi-prepolymer, and O.S. means one-shot in describing methods of producing forms; and $f$ is functionality of an isocyanate reactive compound.

TABLE I

| System, A/B | Drop ball impact (inch-lbs.) | |
|---|---|---|
| | Q.P. | O.S |
| (NCO-10/P-400)/460 DMG | >42.5 | |
| NCO-10/(460 DMG/P400) | | 14.5 |

These foams were prepared by Procedure A above.

The impact strength results given in Table II are illustrative of the improved impact resistance obtained in the practice of this invention and of the effect of the concentration in the urethane polymer of linkages resulting from an organic isocyanate-terminated adduct formed by reacting 2 molecules of a polyisocyanate with 1 molecule of a poly(oxyalkylene)diol.

TABLE II

| Foam | Number percent of linkages in the urethane polymer formed by the isocyanate-terminated adduct | Drop ball impact strength (inch-lbs.) |
|---|---|---|
| A | 0 | 15.9 |
| B | 0<B<5.3 | 17.9 |
| C | 5.3 | 24.2 |
| D | 10.68 | 39.0 |
| E | 15.36 | 44.8 |

All of the above compositions employed the same polyisocyanate (MR) and the same "polyether polyol" based on methyl glucoside, glycerol and propylene oxide.

Foams A, B, C, D and E of Table II were prepared using the molding procedure and molding conditions of Example I except as follows:

Foam A was prepared with the polyol mixture of Example I and MR polyisocyanate having a free isocyanate content of 31.8% by weight instead of the polyisocyanate composition shown in Example 1. The specific weights of polyisocyanate and polyol mixture were adjusted accordingly, as may be practiced by those skilled in the art.

Foam B employed the same polyisocyanate as Foam A; however, the polyol mixture shown in Example 1 was revised to comprise 80.9 parts of the polyoxypropylated α-methyl glucoside-polyoxypylated glycerine mixture of Example 1, having a hydroxyl number of 431.8, 7.2 parts of a poly(oxypropylene) diol having an average molecular weight of about 400, 10.0 parts of monofluorotrichloromethane, 1.5 parts of a silicone glycol copolymer surfactant and 0.4 part of N,N,N',N'-tetramethyl-1,3-butane diamine. The specific amounts of the polyisocyanate and polyol mixture employed were appropriately adjusted to compensate for the difference in the percent NCO of the polyisocyanate and the effective hydroxyl number of the polyol mixture as may be practiced by those skilled in the art.

Foam C was prepared with the polyol mixture of Example 1 and in place of the polyisocyanate composition of Example 1, a polyisocyanate composition was employed, which was obtained by reacting 1000 grams of MR polyisocyanate having a free isocyanate content of 31.8% by weight with 75.36 grams of a poly(oxypropylene)diol having an average molecular weight of about 400. The resulting polyisocyanate composition exhibited a free isocyanate content of about 27.7% by weight. The specific amounts of the polyol mixture and polyisocyanate composition employed were adjusted to correct for the differences in the isocyanate contents of the polyisocyanate compositions as may be practiced by those skilled in the art.

Foam D was prepared with the polyol mixture of Example 1 and a polyisocyanate composition having a free isocyanate content of about 24.8% by weight and obtained by reacting 1000 grams of MR polyisocyanate having a free isocyanate content of about 31.8% by weight with 145.97 grams of a poly(oxypropylene) diol having an average molecular weight of about 400 in place of the polyisocyanate composition of Example 1. The specific weights of the polyol mixture and polyisocyanate composition used in this foam were adjusted to compensate for the differences in free NCO contents of the polyisocyanate composition used in Foam D and the polyisocyanate composition of Example 1, as may be practiced by those skilled in the art.

Foam E was prepared with the polyol mixture of Example 1 and a polyisocyanate composition having a free isocyanate content of 22.4% by weight and obtained by reacting 1000 grams of MR polyisocyanate having a free isocyanate content of about 32.0% by weight with 203 grams of a poly(oxypropylene) diol having an average molecular weight of about 400 in place of the polyisocyanate composition of Example 1. The specific weights of the polyol mixture of Example 1 and the polyisocyanate composition used in this foam were adjusted to correct for the differences between the free isocyanate contents of the polyisocyanate composition of Example 1 and the polyisocyanate composition used in the preparation of this foam, as may be practiced by those skilled in the art.

(b)

The effect of the 2/1 polyisocyanate/diol adduct linkage concentration in the urethane polymer on the physical properties of the foam moldings (i.e. the impact resistance) was described above and shown through the preparation and evaluation of moldings made with 20.80% NCO and 25.5% NCO MR/P1285 quasi-prepolymers. P1285 is a poly(oxypropylene) diol having an average molecular weight of about 1285.

The drop ball impact values obtained on foam moldings prepared the two MR/P1285 quasi-prepolymers described above are given in Table III for a polyoxypropylated sucrose (RS450) and a polyoxypropylated sorbitol (SP760) system. The data given in Table III tends to indicate that drop ball impact resistance is inversely related to the quasi-prepolymer NCO content. Since the 2/1 polyisocyanate/diol adduct linkage concentration in the urethane polymer is an inverse function of the NCO content of the quasi-prepolymer the data in Table III indicates that drop ball impact resistance is a direct funccentration in the urethane polymer (i.e. drop ball imtion of the 2/1 polyisocyanate/diol adduct linkage conpact strength increases with increasing 2/1 polyisocyanate/diol adduct linkage concentration).

TABLE III

[20.85% vs. 25.5% NCO MR/P1285 Q.P.]

| Polyol component | Drop ball impact (inch-lbs.) | |
| --- | --- | --- |
| | 20.85% NCO MR/P1285 Q.P. | 25.5% NCO MR/P1285 Q.P. |
| RS 450 | 32.5 | 16.5 |
| SP 760 | 30.5 | 10.5 |

The foams in Table III were made in accordance with Procedure A.

Comparsion of the results obtained with the MR/P1285 quasi-prepolymer with those obtained with an MR/P400 quasi-prepolymer at a comparable 2/1 polyisocyanate/diol adduct linkage concentration would permit the evaluation of effect of diol chain length on the physical properties of the foam moldings. Drop ball impact resistance appears to increase with increasing diol chain length, over a diol molecular weight range of 400 to 1285, as indicated by the data given in Table IV.

TABLE IV

[MR/P400 Q.P. vs. MR/P1285 Q.P.[1]]

| Polyol component | Drop ball impact (inch-lbs.) | |
| --- | --- | --- |
| | 25.5% NCO MR/P400 Q.P. | 20.85% NCO MR/P1285 Q.P. |
| RS 450 | 18.5 | 34.5 |
| SP 760 | 20.5 | 42.5 |

[1] Constant percent ½ adduct linkages.

The foams in Table IV were prepared in accordance with Procedure A.

Although it is to be understood that the invention should not be limited by this explanation, it is believed that the impact resistance of the rigid foam is a function of the structure of the urethane polymer in the foam and the presence of shock absorbing links built into the polymer structure, which act as energy absorbers permitting the foam to absorb impacts without producing fracture of the foam. The shock absorber links are believed to result from the incorporation of the difunctional organic compound, preferably the reaction product of the reaction between 2 molecules of a polyisocyanate and 1 molecule of an organic compound containing 2 isocyanate reactive hydrogens per molecule, into the urethane polymer during the formation of the rigid polyurethane foam. We have found that the impact resistance properties of the rigid polyurethane foam may be controllably varied by varying the nature and concentration of these shock absorber links incorporated into the urethane polymer, the concentration of the difunctional organic component being such that it is always present as a minor constituent in the urethane polymer and less than either the concentration of the polyisocyanate or the total concentration of the other polyhydroxy compounds used in preparing the rigid polyurethane foam.

The advantages of the polyisocyanate/diol quasi-prepolymers disclosed herein over prior art rigid polyurethane foam type quasi-prepolymers with respect to viscosity, mixing and moldability can be demonstrated in the preparation of self-skinned rigid polyurethane foam moldings. The polyisocyanate/diol quasi-prepolymer compositions of this application (a) exhibit significantly lower viscosity, (b) provide generally better mixing, and (c) generally yield moldings which are more homogeneous than the prior art type quasi-prepolymers. Viscosities in the range of 30,000 to >100,000 cps. @ 77° F. were obtained for the prior art type quasi-prepolymers having a free NCO content of about 25.5% by weight. At a comparable NCO content the polyisocyanate/diol quasi-prepolymers of this invention exhibited viscosities less than 5000 cps. @ 77° F. The high viscosities of the prior art rigid polyurethane foam type quasi-prepolymers appeared to be the primary cause of the heterogenity in the resultant foam moldings.

An additional advantage of the compositions of this invention in view of their chemical and physical properties is that when used in accordance with the process of our copending application, Ser. No. 759,765 now U.S. Pat. 3,608,008, said compositions exhibit highly improved moldability, e.g. relatively low viscosity, over prior art rigid polyurethane foam compositions in the molding of self-skinned, intricately contoured, defect free rigid polyurethane foam moldings of commercial significance.

This invention when used in the practice of the process of our copending application, Ser. No. 759,765, yields impact resistant polyurethane foam moldings comprising a cellular core totally enclosed by a self-generated, dense, relatively hard, durable skin layer of essentially the same chemical composition as the core and having a $D_c/D_o$ ratio of from 0.30 to 0.90 and a $D_s/D_o$ ratio of from 1.2 to 3.0 where $D_c$ is the density of the core, $D_s$ is the density of the skin, and $D_o$ is the overall density of the foam molding. (In "non mineral-filled" polyurethanes, $D_s$ does not exceed about 70 lbs. per cubic foot and the ratios $D_c/D_o$ and $D_s/D_o$ must not be used in such manner as to obtain values of $D_s$ greater than 70 lbs. per cubic foot.) Typically, polyurethane foam moldings obtained by the process of this invention have been found to have structural utility from the standpoint of factors such as high strength to weight ratios, high stiffness, high impact strength, high surface hardness, and durable outer surfaces and to exhibit overall densities in the range of 15.0 to 40.0 lbs. per cubic foot and preferably in the range of 18.0 to 30.0 lbs. per cubic foot. Experiments to substantiate these improvements involved (1) preparation of quasi-prepolymers of this invention and the prior art by reacting aromatic polyisocyanates with diols, polyols ($f > 2$) or polyol/diol blends; (2) the determination of the mixing, free blow and molding behavior of the formulations in the quasi-prepolymer method; and (3) the determination of physical properties (i.e. drop ball impact strength) of self-skinned rigid foam moldings made with the respective formulations.

RESULTS

(1)

Compositions for making rigid polyurethane foam involving the preparation of isocyanate terminated quasi-prepolymers by reacting polyether polyols having more than two hydroxyl groups per molecule, including polyether polyols which are the products of the polyoxyalkylation of polyhydroxy compound/diol mixtures with polyisocyanates are known to the art. Carbohydrates (e.g. sucrose) in particular are know as examples of the polyhydroxy compound. These compositions wherein the carbohydrates are employed as the polyhydroxy compound, have been used in polyoxyalkylation processes in which a diol and/or triol is added to improve the ease with which the carbohydrate based polyether polyol could be prepared. Thus the product of the polyoxyalkylation of the carbohydrate/diol mixture would be itself a mixture of polyoxyalkylated carbohydrate, polyoxyalkylated diol and possibly carbohydrate linked to the diol by a polyoxyalkylene chain. Therefore, to compare the isocyanate terminated polyisocyanate/diol quasi-prepolymers of this application with prior art prepolymers such as those just described a number of isocyanate terminated quasi-prepolymers were prepared wherein a polyol (e.g. G-460 DMG, SP 760 or RS 450; $f=4,6$ and 8 respectively) or a polyol/diol blend was reacted with a stoichiometric excess of a polyisocyanate. Unless otherwise specified in these tests, the ratios and amounts used are by weight.

The compositions and properties of these quasi-prepolymers as well as that of several polyisocyanate/diol quasi-prepolymers are summarized in Table V. Except for the MR/(60/40 G–460 DMG/P400) quasi-prepolymer the NCO:OH ratio was held within a narrow range (i.e. 7.74: 1.00 to 12.04:1.00) so that comparison of quasi-prepolymer viscosities could be made. The MR/(60/40 G–460 mers of this application exhibit significantly lower viscosities than the prior art type quasi-prepolymers (wherein no insoluble phase forms) at comparable free NCO content for any given polyisocyanate. This lower viscosity is a distinct advantage with respect to the handling and processing of the quasi-prepolymer component in the preparation of rigid polyurethane foam.

TABLE V
[QUASI-PREPOLYMER COMPOSITIONS AND PROPERTIES]

| Polyisocyanate | Diol | Polyol | f | NCO:OH (mole) | Polyol:Diol By wt. | Mole | Percent NCO | Viscosity at 77° F. (cps.) | Remarks |
|---|---|---|---|---|---|---|---|---|---|
| MR | P400 | | | 12.04:1.00 | | | 25.67 | 3,600 | |
| MR | | G460 DMG | 4 | 9.49:1.00 | | | 25.42 | 83,000 | |
| MR | P400 | G460 DMG | 4 | 9.51:1.00 | 98:2 | 40.18:1.00 | 25.46 | 87,700 | |
| MR | P400 | G460 DMG | 4 | 9.65:1.00 | 90:10 | 7.38:1.00 | 25.45 | 76,000 | |
| MR | P400 | G460 DMG | 4 | 2.90:1.00 | 60:40 | 1.23:1.00 | | Solid | Gelled and solidified in flask. |
| MR | Ethylene Glycol. | G460 DMG | 4 | 8.94:1.00 | 95:5 | 2.41:1.00 | 25.27 | 99,800 | |
| MR | | RS 450 | 8 | 9.71:1.00 | | | 26.00 | 5,480 | Contains a dispersed solid phase. |
| MR | P400 | RS 450 | 8 | 8.70:1.00 | 98:2 | 19.43:1.00 | 25.87 | 6,990 | Do. |
| MR | P400 | RS 450 | 8 | 9.87:1.00 | 90:10 | 3.57:1.00 | 25.76 | 14,625 | Do. |
| MR | Ethylene glycol. | RS 450 | 8 | 9.09:1.00 | 95:5 | 1.17:1.00 | 26.02 | 4,945 | Do. |
| MR | | SP 760 | 6 | 9.11:1.00 | | | 25.28 | >100,000 | Does not dissolve readily in toluene precipitated out upon addition of dibutylamine. |
| MR | P400 | SP760 | 6 | 9.13:1.00 | 98:2 | 28.3:1.00 | 25.21 | >100,000 | Same as for MR/SP760 Q.P. |
| MR | P400 | SP760 | 6 | 9.28:1.00 | 90:10 | 5.21:1.00 | 25.13 | >100,000 | Do. |
| MR | Ethylene glycol. | SP760 | 6 | 8.66:1.00 | 95:5 | 1.70:1.00 | 24.96 | >100,000 | Do. |
| NCO-10 | P400 | | | 10.87:1.00 | | | 25.33 | 2,549 | |
| NCO-10 | | G460 DMG | 4 | 9.36:1.00 | | | 25.81 | 31,075 | |
| NCO-10 | P400 | G460 DMG | 4 | 9.53:1.00 | 90:10 | 7.38:1.00 | 25.77 | 21,125 | |
| NCO-10 | P400 | SP 760 | 6 | 9.17:1.00 | 90:10 | 5.21:1.00 | 25.47 | 25,875 | |
| MR | | P1285 | | 13.03:1.00 | | | 20.85 | 4,230 | |
| TD-80 | P400 | | | 9.89:1.00 | | | 34.93 | 80 | |
| TD-80 | | RS 450 | 8 | 7.74:1.00 | | | 34.17 | 210 | |
| TD-80 | P400 | RS 450 | 8 | 7.89:1.00 | 90:10 | 3.57:1.00 | 34.21 | 160 | |

DMG/P400) quasi-prepolymer, having a theoretical NCO content of 14.55% was prepared at an NCO:OH ratio of 2.90:1.00 so as to achieve a concentration of P400 in the quasi-prepolymer comparable to that present in the MR/P400 quasi-prepolymer while keeping the level of P400 in the polyol/diol blend below 50%. This quasi-prepolymer gelled in the flask and solidified upon cooling to room temperature. Subsequent evaluation of this toluene insoluble quasi-prepolymer could not be undertaken. Quais-prepolymers of quite high viscosity, 76,600 to 99,800 cps. @ 77° F., were obtained when G–460 DMG, a 98/2 G–460 DMG/P400 blend, a 90/10 G–460 DMG/P400 blend or a 95/5 G–460 DMG/ethylene glycol blend was reacted with MR. On the other hand the MR/P400 quasi-prepolymer of comparable NCO content exhibited a viscosity of 3600 cps. @ 77° F. Viscosities of greater than 100,000 cps. @ 77° F. were obtained for the MR quasi-prepolymers made with SP760 or 98/2 SP 760/P400, 90/10 SP 760/P400 and 95/5 SP 760/ethylene glycol blends. The exact viscosities could not be established on the particular Brookfield viscometer employed because of its 100,000 cps. limit. Quasi-prepolymers containing an undesirable dispersed, insoluble, solid phase were obtained when MR was reacted with RS450 or 98/2 RS450/P400, 90/10 RS450/P400 95/5 RS450/ethylene glycol blends. The infrared spectrum obtained for the dispersed solid phase of the MR/RS450 quasi-prepolymer indicated that the solid was a urethane (i.e. the MR-RS450 reaction product). Except for the MR/(90/10 RS450/P400) quasi-prepolymer which exhibited a viscosity of 14,625 cps. @ 77° F., the RS450 containing quasi-prepolymers made with MR exhibited relatively low viscosities (i.e. 4945–6990 cps. @ 77° F.) but only because of the presence of an undesirable, insoluble, solid phase.

(2)

The quasi-prepolymers made with the various polyols and polyol/diol blends shown in Table V were representative of prior art quasi-prepolymer compositions used for preparing rigid polyurethane foam. Therefore, they may be compared to the polyisocyanate/diol (MR/P400) quasi-prepolymers of this application. It appears quite evident from an examination of the viscosity data given in Table V that the polyisocyanate/diol quasi-prepoly- (2–3)

A summary of the mixing and molding behavior of the several formulations investigated is given in Table VI. The mixing behavior of a formulation may be described as the ability of the A (i.e. polyisocyanate) and B (i.e. polyol masterbatch) components to form an apparently homogeneous system upon being mechanically mixed for a short period of time (e.g. 20 seconds). Comparison of the mixing behavior observations and A-component viscosities shown in Table VI indicates that mixing behavior is an inverse function of the A-component viscosity. Therefore, the mixing advantage of the low-viscosity quasi-prepolymers of the invention versus similar prior art quasi-prepolymers is evident. Thus, in addition to having a viscosity advantage over the prior art quasi-prepolymers the quasi-prepolymers of this application have a mixing advantage.

Moldability may be described as that behavior of a foam formulation which relates to the fill out, color uniformity, cell sttructure uniformity and void or defect content of a self-skinned foam molding. Good moldability means the formation of a completely filled out self-skinned foam molding having uniform color, uniform cell structure within the skin and core regions and being free of defects such as trapped air and collapsed cells. Poor moldability on the other hand leads to the formation of self-skinned foam moldings which exhibit any or all of the following:

(a) non-uniform cell structure in the core and/or skin regions
(b) non-uniform color
(c) surface and subsurface voids
(d) trapped air
(e) incomplete fill out The moldability of the MR based quasi-prepolymer type foam formulations shown in Table VI is an inverse function of the quasi-prepolymer viscosity (i.e. moldability decreased as quasi-prepolymer viscosity increased). Thus, the low viscosity of the polyisocyanate/diol quasi-prepolymer provides an advantage over prior art quasi-prepolymer with respect to moldability (i.e. the systems employing the polyisocyanate/diol quasi-prepolymer exhibit better moldability than the systems employing the prior art type quasi-prepolymers).

rigid foam molding obtained under the same molding conditions using a one-shot process with the same poly-

TABLE VI

Molding compositions and properties]

| Experiment number | A—component | A—comp. visc. at 77° F. (cps.) | B—component | Mixing behavior | Molding result ½ × 4 × 10 inch molding |
|---|---|---|---|---|---|
| 1 | MR/P400 25.67% NCO | 3,600 | 460 DMG/F-11/DC 193/TMBDA 86/12.4/1.0/0.6. | Good | Reasonably uniform. |
| 2 | MR/460 DMG 25.42% NCO | 83,000 | Same as above | V—Poor; too viscous. | Poor streaked. |
| 3 | MR/(98/2 460 DMG/P400) 25.46% NCO | 87,700 | do | do | Do. |
| 4 | MR/(90/10 460 DMG/P400) 25.45% NCO | 76,600 | do | do | Do. |
| 5 | MR/(95/5 460 DMG/EG) | 99,800 | do | do | Do. |
| 6 | NCO-10/P400 25.33% NCO | 2,547 | do | Good | Good; uniform color; soft surface. |
| 7 | TD-80/P400 34.93% NCO | 80 | RS 450/F-11/DC 193/TMBDA 86/12.4/1.0/0.6. | do | Off white, uniform color. |
| 8 | MR/P1285 25.5% NCO | 1,475 | SP 760/F-11/DC 193/TMBDA 86/12.4/1.0/0.6. | do | Uniform color. |

The following examples further illustrate how the present invention may be practiced.

EXAMPLE 1

57.98 grams of a polyisocyanate composition, at about 120° F. having a viscosity of 6760 cps. at 73° F. and a free isocyanate contnt of 24.79% by weight, prepared by reacting 1000 grams of a polyisocyanate having a free isocyanate content of 31.8% by weight with 145.97 grams of a poly(oxypropylene) diol having an average molecular weight of about 400 and a hydroxyl number of 273.9, were mixed with 48.02 grams of a polyol mixture at about 70° F. comprising 88.1 parts of a propylene oxide-methyl glucoside, propylene oxide-glycerine adduct mixture having a hydroxyl number of 431.8, 10.0 parts of monofluorotrichloromethane, 1.5 parts of silicone glycol copolymer surfactant and 0.4 part of N,N,N',N' - tetramethyl-1,3-butanediamine, and poured into a 20 cubic inch, rigid, aluminum mold previously heated to about 120° F. The mold was closed and clamped shut and placed in a circulating air oven at 120° F. for 20 minutes. The resulting rigid foam molding, which had an overall density of about 20 lbs./ft.$^3$, was found to have 144% greater drop ball impact resistance than a rigid foam molding obtained under the same molding conditions using a one shot process with the same polyisocyanate used in the polyisocyanate composition above and polyether polyol formulation used for the quasi-prepolymer formulation above wherein 51.41 grams of said polyisocyanate at about 120° F. were mixed with 54.59 grams of a polyol mixture at about 70° F. comprising 88.1 parts of polyether polyol, 10.0 parts of monofluorotrichloromethane, 1.5 parts of silicon glycol copolymer surfactant and 0.4 part of N,N,N'N'-tetramethyl-1,3-butanediamine.

EXAMPLE 2

54.91 grams of a polyisocyanate composition, at about 120° F. having a viscosity 570 cps. @ 73° F. and a free isocyanate content of 27.8% by weight, prepared by reacting 1000 grams of a polyisocyanate having a free isocyanate content of 31.8% by weight, with 123.19 grams of a poly(oxypropylene) diol having an average molecular weight of about 3369 and a hydroxyl number of 33.3 were mixed with 51.09 grams of a polyol mixture at about 70° F. comprising 88.1 parts by weight of a propylene oxide-methyl glucoside, propylene oxide-glycerine adduct mixture having a hydroxyl number of 431.8, 10.0 parts by weight of monofluorotrichloromethane, 1.5 parts by weight of silicone glycol copolymer surfactant and 0.4 part by weight of N,N,N'N'-tetramethyl-1,3-butanediamine, and poured into a 20 cubic inch, rigid, aluminum mold previously heated to about 120° F. The mold was closed and clamped shut and placed in a circulating air oven at 120° F. for 20 minutes. The resulting rigid foam molding, which had an overall density of about 20 lbs./ft.$^3$ was found to have 145% greater drop ball impact resistance than a isocyanate used in the polyisocyanate composition of this example and polyether polyol formulation used for the quasi prepolymer formulation above wherein 51.41 grams of said polyisocyanate at about 120° F. were mixed with 54.59 grams of a polyol mixture at about 70° F. comprising 88.1 parts by weight of polyether polyol, 10.0 parts by weight of monofluorotrichloromethane, 1.5 parts by weight of silicone glycol copolymer surfactant and 0.4 part by weight of N,N,N'N' - tetramethyl-1,3-butanediamine.

EXAMPLE 3

55.01 grams of a polyisocyanate composition, at about 120° F. having a viscosity of 600 cps. @ 73° F. and a free isocyanate content of 27.7% by weight, prepared by reacting 1000 grams of a polyisocyanate having a free isocyanate content of 31.8% by weight with 106.77 grams of an ethylene oxide/propylene oxide copolymer diol having an average molecular weight of about 1100 and a hydroxyl number of 96.5 were mixed with 50.99 grams of a polyol mixture at about 70° F. comprising 88.1 parts by weight of propylene oxide-methyl glucoside, propylene oxide-glycerine adduct mixture having a hydroxyl number of 431.8, 10.0 parts by weight of monofluorotrichloromethane, 1.5 parts by weight of silicone glycol copolymer surfactant and 0.4 part by weight of N,N,N'N'-tetramethyl-1,3-butanediamine, and poured into a 20 cubic inch, rigid, aluminum mold previously heated to about 120° F. The mold was closed and clamped shut and placed in a circulating air oven at 120° F. for 20 minutes. The resulting rigid foam molding, which had an overall density of about 20 lbs./ft.$^3$ was found to have 60% greater drop ball impact resistance than a rigid foam molding obtained under the same molding conditions using a one shot process with the same polyisocyanate used in the polyisocyanate composition of this example and polyether polyol formulation used for the quasi-prepolymer formulation above wherein 51.41 grams of said polyisocyanate at about 120° F. were mixed with 54.59 grams of a polyol mixture comprising 88.1 parts by weight of polyether polyol, 10.0 parts by weight of monofluorotrichloromethane, 1.5 parts by weight of silicone glycol copolymer and 0.4 part by weight of N,N,N'N'-tetramethyl-1,3-butanediamine.

EXAMPLE 4

55.54 grams of a polyisocyanate composition at about 120° F. having a viscosity of 950 cps. at 74° F. and a free isocyanate content of 27.28% by weight, prepared by reacting 1000 grams of a polyisocyanate having a free isocyanate content of 32.0% by weight with 92.78 grams of a poly(oxyethylene) diol having an average molecular weight of about 600 and a hydroxyl number of 203.5 were mixed with 50.46 grams of a polyol mixture at about 70° F. comprising 88.1 parts of a propylene oxide-methyl glucoside, propylene oxide-glycerine adduct mixture having a hydroxyl number of 434, 10.0 parts of monofluorotrichloromethane, 1.5 parts of silicone glycol copolymer surfactant and 0.4 part of N,N,N',N'-tetramethyl-1,3-butanediamine, and poured into a 20 cubic inch, rigid, aluminum mold previously heated to about 135° F. The mold was closed and clamped shut and placed in a circulating air oven at 135° F. for 20 minutes. The resulting rigid foam molding, which had an overall density of about 20 lbs./ft.³, was found to have about 76% greater drop ball impact resistance than a rigid foam molding obtained under the same molding conditions using a one shot process with the same polyisocyanate used in the polyisocyanate composition of this example and polyether polyol formulation used for the quasi-prepolymer formulation above wherein 52.29 grams of said polyisocyanate at about 120° F. were mixed with 53.71 grams of a polyol mixture at about 70° F. comprising 88.1 parts of polyether polyol, 10.0 parts of monofluorotrichloromethane, 1.5 parts of silicone glycol copolymer surfactant and 0.4 part of N,N,N',N'-tetramethyl-1,3-butanediamine.

EXAMPLE 5

55.33 grams of a polyisocyanate composition, at about 120° F. having a viscosity of 560 cps. at 77° F. and a free isocyanate content of 27.4% by weight prepared by reacting 1000 grams of a polyisocyanate having a free isocyanate content of 32.0% by weight with 116.1 grams of a poly(oxypropylene) diol having an average molecular weight of about 1300 and a hydroxyl number of about 86.5 were mixed with 50.67 grams of a polyol mixture at about 70° F. comprising 87.9 parts of a propylene oxide-methylglucoside, propylene oxide-glycerine adduct mixture having a hydroxyl number of about 431.8, 10.0 parts of monofluorotrichloromethane, 1.5 parts of silicone glycol copolymer surfactant and 0.6 part of N,N,N',N'-tetramethyl-1,3-butanediamine, and poured into a 20 cubic inch, rigid adluminum mold previously heated to about 135° F. The mold was closed and clamped and placed in a circulating air oven at 135° F. for 20 minutes. The resulting rigid foam molding, which had an overall density of about 20 lbs./ft.³ was found to have 89.3% greater impact resistance than a rigid foam molding obtained under the same conditions using a one shot process with the same polyether polyol and polyisocyanate used in the polyisocyanate composition of this example used for the quasi-prepolymer formulation above wherein 52.29 grams of said polyisocyanate at about 120° F. were mixed with 53.71 grams of a polyol mixture at about 70° F. comprising 88.1 parts of polyether polyol, 10.0 parts of monofluorotrichloromethane, 1.5 parts of silicon glycol copolymer surfactant and 0.4 part of N,N,N',N'-tetramethyl-1,3-butanediamine.

EXAMPLE 6

30.74 grams of a polyisocyanate composition at about 120° F. having a free isocyanate content of about 25.38% by weight and obtained by reacting 88.94 parts by weight of MR polyisocyanate having a free isocyanate content of about 31.25% by weight with 11.06 parts by weight of a poly(oxypropylene) diol having an average molecular weight of about 400 was thoroughly mixed with 25.96 grams of a polyol mixture at about 70° F. comprising 88.1 parts by weight of a polyoxypropylated α-methyl glucoside-polyoxy-propylated glycerine mixture having an hydroxyl number of about 434, 10.0 parts by weight of monofluorotrichloromethane, 1.5 parts by weight of a silicon-glycol copolymer surfactant and 0.4 part by weight of N,N,N',N'-tetramethyl-1,3-butane diamine. The resulting liquid mixture was immediately charged to a 12 cubic inch aluminum mold preheated to 120° F. The mold was immediately closed and clamped shut, whereupon the contents of the mold were allowed to foam and fill the mold. Approximately 4 minutes after the mold had been closed and clamped shut the mold was placed in a 120° F. oven for a period of 20 minutes. The mold was then removed from the oven and the resultant molded rigid polyurethane foam article recovered from the mold. The molded rigid polyurethane foam article obtained exhibited the following properties:

overall density $(D_o)$ = 17.99 lbs./ft.³
core density $(D_c)$ = 9.47 lbs./ft.³
skin density $(D_s)$ = 35.15 lbs./ft.³
$D_c/D_o$ = 0.53
$D_s/D_o$ = 1.95.

EXAMPLE 7

43.32 grams of the polyisocyanate composition of Example 6, at about 120° F. were thoroughly mixed with 36.58 grams of the polyol mixture of Example 6, at 70° F. and the resultant liquid mixture immediately charged to the 12 cubic inch aluminum mold of Example 6 preheated to the temperature prescribed in Example 6. Utilizing the molding procedure and conditions of Example 6, a molded rigid polyurethane foam article was obtained which exhibited the following properties:

overall density $(D_o)$ = 25.35 lbs./ft.³
core density $(D_c)$ = 13.88 lbs./ft.³
skin density $(D_s)$ = 45.66 lbs./ft.³
$D_c/D_o$ = 0.55
$D_s/D_o$ = 1.80.

EXAMPLE 8

This example demonstrates the preparation of a quasi-prepolymer disclosed in the prior art and some of the properties exhibited by said quasi-prepolymer. About 712.6 grams of MR polyisocyanate having a free isocyanate having a free isocyanate content of about 31.73% by weight were reacted with 37.4 grams of 1,3-butane diol (molecular weight=90) to give a liquid product. An attempt to determine the free isocyanate content of the liquid product by a standard chemical analysis technique equivalent to that disclosed in ASTM D 1638–61T revealed the presence of a solid toluene insoluble phase in the product. The presence of this solid insoluble phase prevented the reliable determination of the free isocyanate content of the product since total solubility is required for a reliable determination. The presence of a solid insoluble phase in the product was confirmed by (a) the separating out of solid insoluble particles when a sample of the product was placed in a test tube containing a quantity of dry toluene and the contents of the test tube thoroughly agitated, and (b) the presence of solid particles in a thin film of the product spread on the surface of a clean dry watch glass. Since the starting polyisocyanate and 1,3-butane diol used in this example were essentially anhydrous and free of solid insoluble material the presence of a solid insoluble material in the quasi-prepolymer product strongly indicates that said solid insoluble material in the quasi-prepolymer product resulted from the reaction of the polyisocyanate with the 1,3 butane diol. This physically heterogeneous, prior art type quasi-prepolymer is to be contrasted to the physically homogeneous, completely toluene soluble quasi-prepolymers of this invention which are disclosed in the examples of the specification.

What is claimed is:

1. A process characterized by improved mixing and moldability for producing a molded, cellular, rigid polyurethane article of improved physical characteristics which comprises: (1) mixing an organic polyhydroxy compound having 3–10 hydroxyl groups per molecule or polyol mixtures containing at least about 60% of said polyhydroxy compound which polyhydroxy compound or mixtures comprise the product of the reaction of an alkylene oxide with a polyhydric alcohol with an organic polyisocyanate composition which is the product of the reaction of from about 8 to about 100 equivalent weight units of an organic polyisocyanate compound with one equivalent weight unit of a difunctional organic compound in the presence of a halogenated hydrocarbon blowing agent; (2) passing the resulting mixture into a closable mold and curing in a closed mold; and (3) removing the resultant article, wherein the said difunctional organic compound is selected from the group consisting of poly(oxyalkylene) diol poly(oxyalkylene) dithiol, polyalkylene diol said diols having a molecular weight of at least about 400 polyalkylene dithiol, poly(oxyalkylene) diamine, polyalkylene diamine, ω-amino-poly(oxyalkylene)alcohol, ω-amino - polyalkylene alcohols, poly(oxyalkylene) dicarboxylic acids, polyalkylene dicarboxylic acids, ω-hydroxy-poly(oxyalkylene) carboxylic acids, ω-amino-poly(oxyalkylene) carboxylic acids, poly(oxyalkylene) dicarboxamides, and polyalkylene dicarboxamides, wherein amine and amide means N-mono-substituted compounds where the substituent is a $C_{1-5}$ alkyl group.

2. The process of claim 1 wherein (1) is selected from the group consisting of the reaction product of (a) propylene oxide, ethylene oxide, or both with (b) sucrose, sorbitol, methyl glucoside, pentaerythritol or mixtures thereof.

3. A molded, cellular, rigid polyurethane article of improved physical characteristics comprising the product produced by the reaction of an organic polyhydroxy compound having 3–10 hydroxyl groups per molecule or polyol mixtures containing at least about 60% of said polyhydroxy compound which polyhydroxy compound or mixtures comprise the product of the reaction of an alkylene oxide with a polyhydric alcohol with an organic polyisocyanate composition which is the product of the reaction of from about 8 to about 100 equivalent weight units of an organic polyisocyanate compound with one equivalent weight unit of a difunctional organic compound in the presence of a halogenated hydrocarbon blowing agent wherein the said difunctional organic compound is selected from the group consisting of poly (oxyalkylene)diol, poly(oxyalkylene)dithiol, polyalkylene diol said diols having a molecular weight of at least about 400 polyalkylene dithiol, poly(oxyalkylene) diamine, polyalkylene diamine, ω-amino-poly(oxyalkylene)alcohol, ω-amino-polyalkylene alcohols, poly(oxyalkylene) dicarboxylic acids, polyalkylene dicarboxylic acids, ω-hydroxy-poly(oxyalkylene) carboxylic acids, ω-amino-poly(oxyalkylene) carboxylic acids, poly(oxyalkylene) dicarboxamides, and polyalkylene dicarboxamides, wherein amine and amide means N-mono-substituted compounds where the substituent is a $C_{1-5}$ alkyl group.

4. The product of claim 3 wherein the organic polyhydroxy compound is selected from the group consisting of the reaction produce of (a) propylene oxide, ethylene oxide, or both with (b) sucrose, sorbitol, methyl glucoside, pentaerythritol or mixtures thereof.

5. The product of claim 3 wherein there is provided a dense durable skin layer of essentially the same chemical composition as the lower density core and having a $D_c/D_p$ ratio of from 0.30 to 0.90 and a $D_s/D_o$ ratio of from 1.2 to 3.0 where $D_c$ is the density of the core, $D_s$ is the density of the skin, and $D_o$ is the overall density of the foam molding.

References Cited

UNITED STATES PATENTS

| | | | |
|---|---|---|---|
| 3,472,800 | 10/1969 | Kuryla | 260—2.5 |
| 3,305,535 | 2/1967 | Merten | 260—77.5 |
| 3,251,785 | 5/1966 | Anderson | 260—2.5 AS |
| 3,178,490 | 4/1965 | Petrino | 260—2.5 X |
| 3,149,083 | 9/1964 | Gmitter | 260—2.5 |

FOREIGN PATENTS

| | | | |
|---|---|---|---|
| 686,281 | 5/1964 | Canada | 260—2.5 |
| 769,091 | 2/1957 | Great Britain | 260—2.5 AP |

DONALD E. CZAJA, Primary Examiner

C. W. IVY, Assistant Examiner

U.S. Cl. X.R.

260—2.5 AM, 2.5 AP, 2.5 AS, 2.5 AZ

UNITED STATES PATENT OFFICE
CERTIFICATE OF CORRECTION

Patent No. 3,728,288                    Dated April 17, 1973

Inventor(s) W.H. Cobbs, Jr., et al

It is certified that error appears in the above-identified patent and that said Letters Patent are hereby corrected as shown below:

| COLUMN | LINE | ERROR |
| --- | --- | --- |
| 3 | 32 | "by the" should be --and the --. |
| 4 | 21 | "XU" should be "XQ" |
| 4 | 53 | there should be a comma after the word diisocyanate |
| 4 | 54 | The comma after the word "hexamethylene should be deleted and a comma inserted after the word diisocyanate" |
| 5 | 50 | "molecule of" should be --molecule or --. |
| 7 | 42-43 | "Molecular weight (average) = 686.4; repeated |
| 10 | 72-73 | Lines need to be reversed |
| 10 | 73-75 | The recitation in the parenthesis should read (i.e. drop ball impact strength increases with increasing 2/1 polyisocyanate/diol adduct linkage concentration |
| 11 | Table IV Footnote 1 | "1/2" should be 2/1 --. |

FORM PO-1050 (10-69)

UNITED STATES PATENT OFFICE
CERTIFICATE OF CORRECTION

Patent No. 3,728,288　　　　　　　Dated April 17, 1973

Inventor(s) W.H. Cobbs, Jr., et al　　　　Page - 2

It is certified that error appears in the above-identified patent and that said Letters Patent are hereby corrected as shown below:

| COLUMN | LINE | ERROR |
|---|---|---|
| 12 | 57 | "know" should be --known --. |
| 13-14 | Table V under Mole 12th line | "28.3:1.00" should be --28.36:1.00 ---. |
| 17 | 35 | "adluminum" should be --aluminum --. |
| 18 | 31 | "having a free isocyanate" repeated. |
| 20 | 16 | "$D_p$" should be $D_0$ --. |

Signed and sealed this 25th day of December 1973.

(SEAL)
Attest:

EDWARD M. FLETCHER, JR.　　　　RENE D. TEGTMEYER
Attesting Officer　　　　　　　　Acting Commissioner of Patents